May 7, 1957 S. H. MENDELSOHN 2,791,268
AUTOMOBILE SEAT AND BACK PAD
Filed Sept. 1, 1955
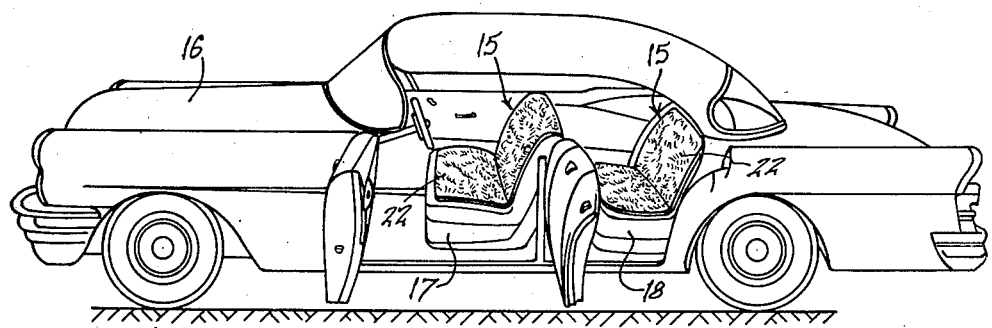
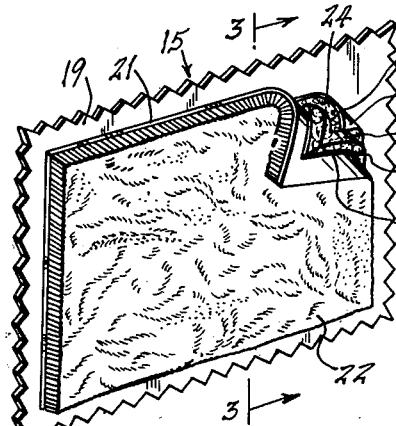
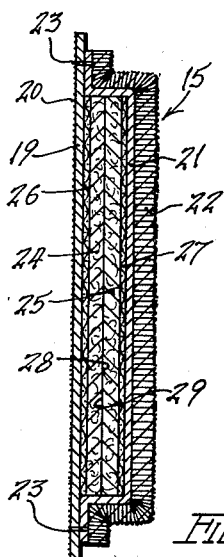
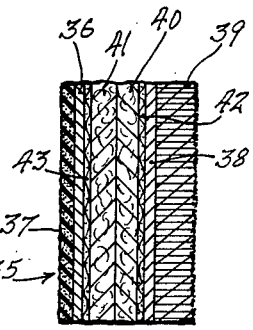
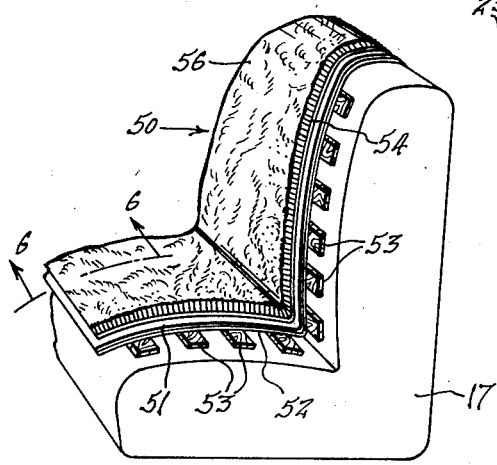
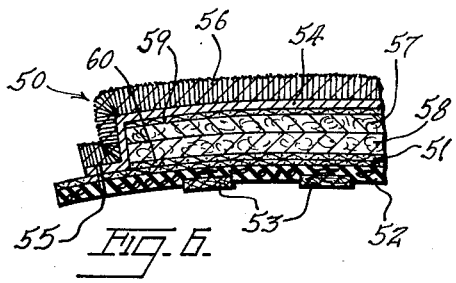
INVENTOR.
SAMUEL H. MENDELSOHN
BY
ATTORNEY

United States Patent Office 2,791,268
Patented May 7, 1957

2,791,268

AUTOMOBILE SEAT AND BACK PAD

Samuel H. Mendelsohn, Brooklyn, N. Y.

Application September 1, 1955, Serial No. 532,042

4 Claims. (Cl. 155—182)

This invention relates to new and useful improvements in automobile seat covers.

More particularly, the present invention proposes the construction of an improved automobile seat and back pad which will not require the driver and occupants of a car having such a pad to sit on cold plastic or fabric in cold weather, and which will give protection to the upholstery as well as comfort to the users.

As a further object, the present invention proposes forming the seat and back pad with a felt-like fabric backing which will not slip or skid on the seat, and a front face of sheepskin with the nap of the sheepskin outwardly disposed.

Another object of the invention proposes constructing the seat and back pad with a padding secured between the sheepskin and the fabric backing of layers of cotton batting with cheesecloth backs and fiber sheet front covers.

Still another object of the invention proposes forming the seat and back pad with a resilient backing on the fabric backing sheet of liquid rubber sprayed on the fabric with a spray gun to prevent stiffening or skidding.

Another object of the invention proposes constructing the seat and back pad with a foam rubber backing on the backing sheet having spaced slats of wood or the like embedded in the rubber and extending crosswise of the pad.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of an automobile having seat and back pads constructed and arranged in accordance with the present invention.

Fig. 2 is a perspective view with one corner broken loose of one of the pads shown in Fig. 1.

Fig. 3 is a sectional view taken on line 3—3 of Fig. 2.

Fig. 4 is a view similar to Fig. 3 but illustrating a modification of the present invention.

Fig. 5 is a view similar to Fig. 1 but illustrating another modification of the present invention.

Fig. 6 is a sectional view taken on line 6—6 of Fig. 5.

The automobile seat and back pad, in accordance with the first form of the invention shown in Figs. 1, 2 and 3, is designated generally by the reference numeral 15.

Two pads 15 are shown in the car 16 illustrated in Fig. 1, one pad being on the front seat 17 and the other on the rear seat 18. The pads are identically constructed.

Pad 15 has a backing sheet 19 of fabric with a felt-like surface 20 adapted to stick to the upholstery of an automobile seat without slipping or skidding. Preferably the surface 20 is a suede finish formed or otherwise applied to or made with the fabric of the backing sheet.

A sheepskin 21 with its nap 22 outwardly disposed is peripherally secured to the backing sheet 19 as by stitches 23. Between the sheepskin and the backing sheet are two layers of cotton batting 24 and 25 having cheesecloth back covers 26 and 27 and fiber sheet front covers 28 and 29. The backing sheet 19 may be made in any desired color or pattern to match or contrast with the upholstery of a car. The cotton wadding or padding may be three-inch cotton wadding.

The nonskid surface 20 of the backing sheet is placed on the seat of the car and the occupants of the car sit on the nap of the sheepskin.

The modification of the invention illustrated in Fig. 4 is characterized by the provision of a seat and back pad 35 having a backing sheet 36 of fabric coated on the outer side with liquid rubber 37 from a spray gun to prevent stiffening or skidding. Sheepskin 38 is secured to the backing sheet 36 with the nap 39 outwardly disposed. Cotton batting sheets 40 and 41 are placed between the sheepskin and the backing sheet and cheesecloth sheets 42 and 43 cover the cotton batting.

The modification of the invention illustrated in Figs. 5 and 6 is characterized by the provision of an automobile seat and back pad 50 having a backing sheet 51 of fabric with a foam rubber outer surface 52 in which are embedded spaced slats 53 of wood or the like extending across the pad. A sheepskin 54 is peripherally secured as by stitches 55 to the backing sheet 51 with the nap 56 outwardly disposed. Between the backing sheet and the sheepskin are cotton batting sheets 57 and 58 having cheesecloth cover sheets 59 and 60 disposed adjacent the sheepskin and the backing sheet.

It is to be understood that the outer rubber layers 37 and 52 are formed with uneven outer surfaces to make the cushion skidproof and to facilitate their easy removal from any automobile seat and back surface without leaving any marks or marring them in any way.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An automobile seat and back pad comprising a fabric backing sheet with a felt-like surface adapted to stick to the upholstery of an automobile seat without slipping and skidding, and a sheepskin facing secured to the backing sheet with the nap of the sheepskin outwardly disposed, said sheepskin being peripherally secured to the backing sheet and padding between the sheepskin and the backing sheet, said padding being a plurality of layers of cotton batting with a reticulate cover secured to the layers on one side and a fiber sheet secured to the layers on the other side of each layer.

2. An automobile seat and back pad comprising a fabric backing sheet with a felt-like surface adapted to stick to the upholstery of an automobile seat without slipping and skidding, and a sheepskin facing secured to the backing sheet with the nap of the sheepskin outwardly disposed, said sheepskin being peripherally secured to the backing sheet and padding between the sheepskin and the backing sheet, said padding being a plurality of layers of cotton batting with a reticulate cover secured to the layers on one side and a fiber sheet secured to the layers on the other side of each layer, said reticulate covers being disposed against the backing sheet and the sheepskin.

3. An automobile seat and back pad comprising a fabric backing sheet with a felt-like surface adapted to stick to the upholstery of an automobile seat without slipping and skidding, and a sheepskin facing secured to the backing sheet with the nap of the sheepskin outwardly disposed, said sheepskin being peripherally secured to the backing sheet and padding between the sheepskin and the backing sheet, said backing sheet having a resilient outer coating with a plurality of spaced slats embedded therein and extending across the pad.

4. An automobile seat and back pad comprising a fabric backing sheet with a felt-like surface adapted to stick to the upholstery of an automobile seat without slipping and skidding, and a sheepskin facing secured to the backing sheet with the nap of the sheepskin outwardly disposed, said sheepskin being peripherally secured to the backing sheet and padding between the sheepskin and the backing sheet, said backing sheet having a resilient outer coating with a plurality of spaced slats embedded therein and extending across the pad, said padding being a plurality of layers of cotton batting with a reticulate cover secured to the layers on one side and a fiber sheet secured to the layers on the other side of each layer, said resilient outer coating being of foam rubber.

References Cited in the file of this patent

UNITED STATES PATENTS

| | | |
|---|---|---|
| 1,927,331 | Witcoff | Sept. 19, 1933 |
| 1,947,152 | Clark | Feb. 13, 1934 |
| 2,016,876 | Stolzenberg | Oct. 8, 1935 |
| 2,303,203 | Faris et al. | Nov. 24, 1942 |